United States Patent [19]
Robertson

[11] 3,756,743
[45] Sept. 4, 1973

[54] ROTORS FOR ROTARY WINGED AIRCRAFT

[76] Inventor: Frank Henry Robertson, 'Coranodo,' 87 Church Rd., County Down, Holywood, Ireland

[22] Filed: Apr. 15, 1971

[21] Appl. No.: 134,369

[30] Foreign Application Priority Data
Apr. 15, 1970 Great Britain.................. 17,916/70

[52] U.S. Cl. ............................... 416/108, 416/114
[51] Int. Cl. ............................................ B64c 27/74
[58] Field of Search ................... 416/108, 112–114, 416/116, 98, 109, 115, 102, 148

[56] References Cited
UNITED STATES PATENTS

| | | | |
|---|---|---|---|
| 1,403,624 | 1/1922 | Pescara | 416/113 |
| 1,454,944 | 5/1923 | Pescara | 416/112 |
| 2,663,374 | 12/1953 | Vandermeer | 416/102 |
| 3,031,017 | 4/1962 | Arcidiacono | 416/114 |
| 3,080,002 | 3/1963 | DuPont | 416/114 X |
| 3,102,597 | 9/1963 | Drees | 416/114 X |
| 3,144,908 | 8/1964 | Pascher | 416/112 |
| 3,525,576 | 8/1970 | Dorand | 416/114 |
| 3,554,662 | 1/1971 | Lemont | 416/113 X |

FOREIGN PATENTS OR APPLICATIONS
791,474   3/1958   Great Britain ...................... 416/114

*Primary Examiner*—Everette A. Powell, Jr.
*Attorney*—Young and Thompson

[57] ABSTRACT

This invention relates to a hub for a rigid rotor of a rotary winged aircraft and includes means for varying the blade angle of attack of each blade of a rotor as each blade rotates around the path traced out by the rotor to bring about a non-sinusoidal cyclic pitch change whilst independently allowing a sinusoidal cyclic pitch control to be superimposed thereon through the medium of a spider, the means being associated with each of the blade roots and includes a spindle for each blade, the spindles being equidistantly mounted for rotational movement in a rotatable component of the hub, and at their inner ends are each in spiral-splined engagement with a plunger whose inner end bears on a fixed cam and whose outer periphery has a predetermined peripheral profile to enable, for each blade, the blade angle of attack in relation to its azimuth position to be varied to suit the speed of the rotary winged aircraft.

1 Claim, 3 Drawing Figures

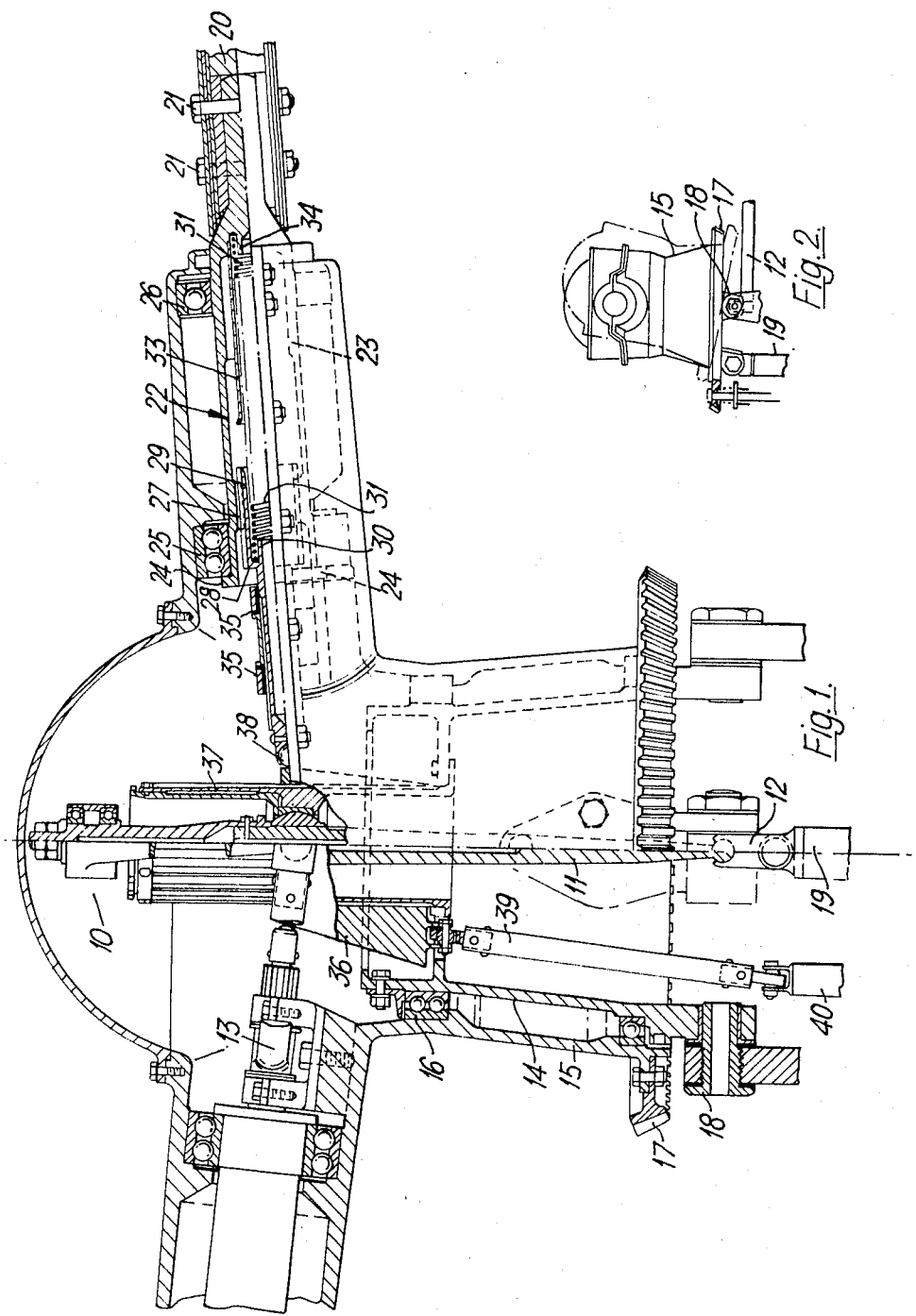

ROTORS FOR ROTARY WINGED AIRCRAFT

This invention relates to rotors for rotary winged aircraft, for example autogyros or helicopters, and in particular to hubs for rotors of the rigid or hingeless rather than hinged type, that is, those which couple the body and rotor in pitch and roll rather than the hinged type of rotor which allows the body and rotor to pitch and roll independently.

Hereinafter in the specification, the path traced out by a rotor with two or more blades rotating is termed "a disc," and the term "blade angle of attack" refers to the inclination of attack at which each blade can be automatically set independently of the others before or during flight.

Hereinbefore, autogyros and helicopters have been provided with rigid rotors each having a hub consisting of a central fixed component and an outer rotatable component on which is mounted two or more blades and in which when the rotor is in a hovering position, the blade angle of attack is the same for each blade all the way round the disc. When a pilot wishes to change the attitude that is, the position of the machine relative to the normal line of flight, the ground or the direction of the wind, in roll or pitch, he uses a conventional cyclic pitch control. This control normally comprises a spider or swashplate which is connected to the roots of the blades and which can be tilted to cause the blade angle of attack to change as a blade travels around the disc, thus causing the disc as a whole to tilt. If the angular change which is applied to a blade by tilting the spider or swashplate is plotted against its azimuth position for a complete revolution of the rotor, the resulting curve is a sine curve. If, on the other hand, the angular change in blade angle of attack which is required for constant lift for a complete revolution is plotted, the resulting curve is only a sine curve for the hovering phase of flight; in forward flight the shape of the curve rapidly becomes more and more asymmetric with increased forward speed due to the fact that lift is proportional to the angle of attack and the square of the speed. With a conventional sinusoidal cyclic pitch control, the sine curve can be displaced so that the tendency of the rotary winged aircraft to roll is cancelled but the total lift generated by the rotor is not constant but varies as the rotor rotates thus causing vibration in the rotary winged aircraft, which vibration becomes progressively more severe with increased forward speed, and therefore disadvantageous.

The advantages of the rigid or hingeless rotor lie in an attitude coupling between rotor and body; however for certain phases of flight, this can bring disadvantages, for example, in an autogyro in slow flight where the disc angle of attack has to be high, (one advantage of a rotory winged aircraft over a fixed winged aircraft is the fact that it cannot be stalled and can therefore accept high angles of attack), by definition, the body angle of attack requires also to be high thereby limiting seriously a pilot's view from his position in the cockpit.

Hereinafter in the specification and claims, the term "rotary winged aircraft" is to include only autogyros and helicopters having a rigid rotor as above described.

An object of the present invention is to obviate or mitigate the aforesaid disadvantages.

The present invention is a rotor hub for a rotary winged aircraft including means, associated with each of the blade roots, for varying the blade angle of attack of each blade as it rotates around the disc to bring about a non-sinusoidal cyclic pitch change whilst independently allowing a sinusoidal cyclic pitch control to be superimposed thereon through the medium of the spider.

Preferably, the means for each blade is also associated with a fixed cam whose outer periphery has a predetermined peripheral profile whereby the blade angle of attack in relation to its azimuth position can be varied to suit the speed of the machine.

Preferably also, the means for varying the blade angle of attack of each blade as it rotates around the disc includes a spindle for each blade, the spindles being equidistantly mounted for rotational movement in the rotatable component of the hub and at their inner ends are each in spiral-splined engagement with a plunger, whose inner end bears on the fixed cam.

An embodiment of the present invention will now be described by way of example with reference to the accompanying drawings of, for simplicity, a hub for a two-blade autogyro in which:

FIG. 1 is an end elevation of the hub in part section, and

FIG. 2 is a side elevation, to a smaller scale, and also showing in dotted formation the hub tilted.

Figure 3:
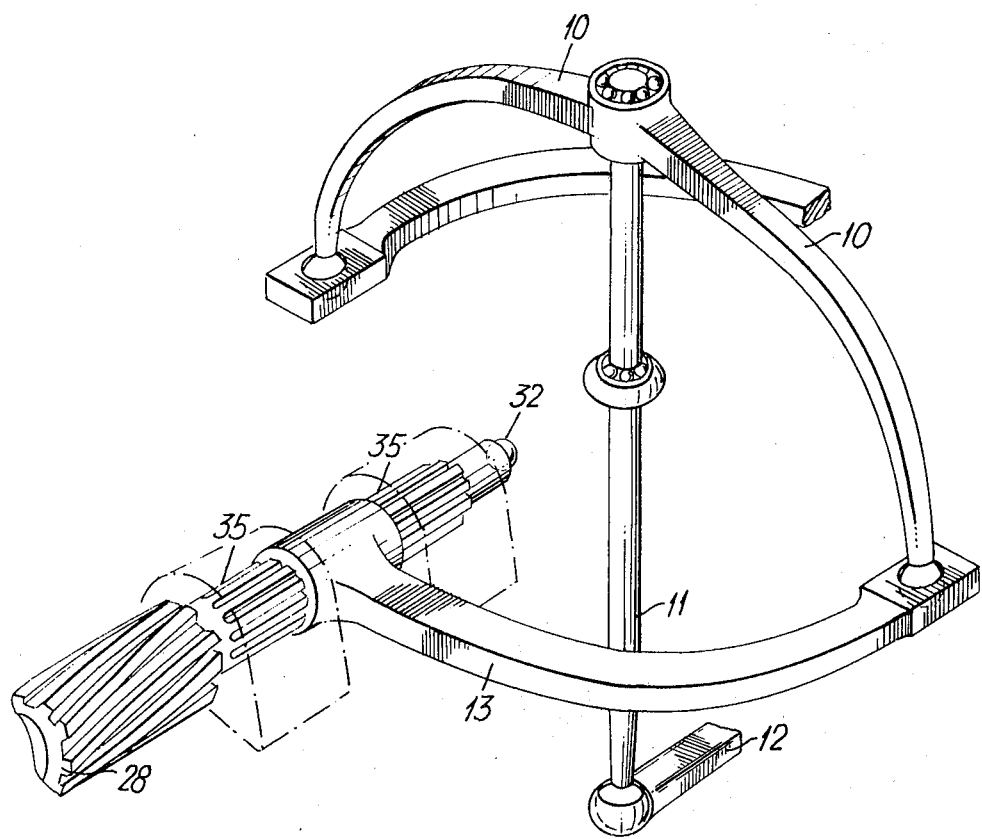
FIG. 3 is an enlarged framentary perspective view of the spider, levers and plungers.

Conventional sinusoidal cyclic control for manoeuvre is imposed by a spider 10 whose attitude is changed by a tiltable spindle 11 coupled to a pilot's control column by a linkage 12. The arms of the spider 10 are joined to levers 13 so that the spider's attitude can be transferred to the blades. The hub comprises a fixed component 14 and a rotatable component 15. The rotatable component 15, which carries the two blades, is mounted on the fixed component 14 by bearings 16, which can accept both lift (thrust) and journal loads, and at its lower end has a gear wheel 17 attached to it for spin-up purposes in an autogyro or main drive in a helicopter. The fixed component 14 of the hub is attached to the body of the aircraft by two pivot bolts 18 which allow it to tilt in the fore and aft plane. The position of the fixed component 14 is controlled by an actuator 19 which can be a screw jack or a fluid ram, and which is connected to a rotor attitude control in the pilot's cockpit.

Each rotor blade root 20 is bolted at 21 to a spindle 22 whose inner end is formed as an open-ended tube 23 terminating in an outwardly projecting peripheral flange 24, and which can rotate about its centreline to change the blade angle of attack. Each spindle 22 is carried in an equi-spaced relationship within the rotatable component 15 of the hub on bearings which are such as to accept the centrifugal and journal loads imposed on them in use. As shown, these bearings are a double row ball thrust and radial race 25 and a single row ball radial races 26, but taper or plain roller bearings could alternatively be used. On the inner face of the tube 23 of each spindle 22 there is a complete ring of spirally cut splines 27 and sliding in these splines 27 is the outer end of a plunger 28 which is complementarily serrated on its outer face, whereby either rotary or linear motion of the plunger 28 will cause the spindle 22 to turn, thus to change the blade angle of attack. The plunger 28 at its outer end terminates in an open-ended tubular section 29 having at its closed end a raised boss 30 around which one end of a helical compression spring 31 is located, the spring 31 extending within the tube 23 of the spindle 22 between the plunger 28 and a collar 33 mounted around an internally extending boss 34 of the spindle 22. Each plunger 28 is carried approximately centrally of its length in journals 35 which are fixed to the rotating component 15 of the hub and which allow the plunger 28 to rotate or to move linearly relative thereto. At its inner end, each plunger 28 bears on the peripheral surface of a cam 36 which is secured to the fixed component 14 of the hub, but which can rise or fall on splines 37 cut in the fixed component 14 as shown. a ball 38 is fitted at the contact point between the inner end of each plunger 28 and the peripheral surface of the cam 36. Other methods of contact between the plunger 28 and cam 36 may be used. The spring provides bias between the spindle 22 and plunger 28 to maintain the ball 38 in contact with the peripheral surface of the cam 36. The spindle 22 and plunger 28 constitutes the means for varying the blade angle of attack. The peripheral surface of the cam 36 has a predetermined profile as shown; at its upper end it is circular to correspond to the hovering or vertical descent phase of flight, and at its lower end it is so shaped as to put the correct blade angle of attack on to the blades at all points around the disc for when the machine is required to move at maximum forward speed. The cam profile changes progressively along its length and its vertical position is controlled by a push rod 39 and an actuator 40 which can be a screw jack or a fluid ram. Control of the actuator 40 can be automatic, by monitoring the dynamic air pressure due to forward speed, or manual by a pilot. The levers 13 are splined to the plungers 28, so that axial movement of the plunger 28 initiated by the cam 36 does not interfere with the sinusoidal cyclic control lever 13, whilst tilting of the spider 10 to rotate the plunger 28 does not impose any axial movement thereupon.

In operation, in a hovering or vertical descent phase of flight, the actuator 40 is retracted and the cam 36 is located at its lowest position in the splines 37 corresponding to an equal blade angle of attack at all azimuth positions. For maximum forward speed, the actuator 40 is extended to move the cam 36 up the splines 37 which in turn causes the blade angle of attack to be varied through various azimuth positions thus keeping blade lift constant. The greater the actuator extension, the greater the variation of blade angle of attack. This latter step relates to non-sinusoidal cyclic pitch change.

Sinusoidal cyclic pitch change is unaffected by the non-sinusoidal cyclic pitch change as hereinbefore described, and for sinusoidal cyclic pitch change, the spider 10 is tilted by pilots' control linkage 12.

The invention is advantageous in that the means for varying the blade angle of attack described herein controls the blade angle of attack around the disc in a manner which ensures constant blade lift at all forward speeds and is designed to allow the normal sinusoidal cyclic control to be used for manoeuvring the machine. A secondary advantage lies in the fact that the machine can be trimmed laterally in forward flight without the necessity as hereinbefore described to have the sinusoidal cyclic control column pushed over to one side, and also the actuator described herein and the method of mounting the fixed component of the hub allow the attitude of the disc angle of attack to be changed relative to the body in flight without limiting the pilot's view.

The invention may be used for rotor hubs with more than two blades.

When the invention is to be applied to a helicopter, a collective pitch control is provided. This is achieved simply by arranging for the entire cyclic pitch control assembly comprising the pilot's control linkage 12, the tiltable spindle 11 and the spider 10, to be raised and lowered vertically so as to change the blade pitch collectively as desired; the spherical tiltable journal carrying the spindle 11, which is illustrated as being firmly clamped within the upper part of the fixed component 14 of the hub, being allowed to rise and fall vertically on splines cut inside the fixed component 14 in a similar way to that by which the cam 36 rises and falls vertically on splines 37 cut outside the fixed component 14.

I claim:

1. A rotor hub for a rotary winged aircraft including a central fixed component and an outer rotatable component, at least two blades mounted at their respective roots on said rotatable component and a cyclic pitch control comprising a spider connected to the roots of the blades and means, associated with each of the blade roots, for varying the blade angle of attack of each blade of a rotor as each blade rotates around the path traced out by the rotor to bring about a non-sinusoidal cyclic pitch change whilst independently allowing a sinusoidal cyclic pitch control to be superimposed thereon through the medium of the spider, said means for varying the blade angle of attack of each blade comprising a spindle attached to each blade said spindles being equidistantly mounted for rotational movement with the rotatable component of the hub and a plunger engagable at one end with the respective blade said plunger being mounted on the rotatable hub component for rotation therewith and linear movement relative thereto and engaging at its other end a cam whose outer periphery is a predetermined peripheral profile, said cam being movable axially of the hub component, said plungers being connected to sinusoidal cyclic control levers mounted on the spider and said levers being splined to said plungers so that axial movement of the plunger initiated by the cam does not interfere with the sinusoidal cyclic control lever, whilst tilting of the spider to rotate the plunger does not impose any axial movement thereupon.

* * * * *